United States Patent
Nakamura

[11] Patent Number: 6,075,615
[45] Date of Patent: *Jun. 13, 2000

[54] PRINTING CONTROL APPARATUS

[75] Inventor: Takumi Nakamura, Kanagawa, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/829,703

[22] Filed: Mar. 26, 1997

[30] Foreign Application Priority Data

Mar. 27, 1996 [JP] Japan ................................. 8-071834

[51] Int. Cl.[7] ............................. G06T 15/00; G05B 11/00
[52] U.S. Cl. ......................................... 358/1.14; 358/1.14
[58] Field of Search ................................... 395/114, 112,
395/115, 116, 200.1, 200.16, 101, 163,
111, 117, 164, 165, 166, 800, 103; 358/1.14,
1.15, 1.12, 1.13, 1.11

[56] References Cited

U.S. PATENT DOCUMENTS

| | | | |
|---|---|---|---|
| 5,220,674 | 6/1993 | Morgan et al. | 395/800 |
| 5,559,933 | 9/1996 | Boswell | 395/114 |
| 5,638,497 | 6/1997 | Kimer et al. | 395/114 |
| 5,659,670 | 8/1997 | Auclair | 395/115 |
| 5,699,495 | 12/1997 | Snipp | 395/114 |
| 5,727,135 | 3/1998 | Webb et al. | 395/112 |
| 5,933,584 | 8/1999 | Maniwa | 395/114 |

FOREIGN PATENT DOCUMENTS 62-226220  10/1987  Japan ................................. G06F 3/12

*Primary Examiner*—Jerome Grant, II
*Assistant Examiner*—Douglas Tran
*Attorney, Agent, or Firm*—Finnegan, Henderson, Farabow, Garrett & Dunner, L.L.P.

[57] ABSTRACT

In a printing control apparatus, when a job accepting unit accepts a print job including a designated printer name, a queue allocating unit decides whether the designated printer name is a virtual printer name or a physical printer name. If the printer name is the virtual printer name, the queue allocating unit adds to the job virtual printer setting information related to the printer name beforehand and appends the job to the tail of a queue corresponding the virtual printer within a spool queue unit. If the printer name is the physical printer name, the queue allocating unit transmits print job data directly to the designated printer. Thus, the user can make certain of operating the specific physical printer without the aid of any queue by designating the physical printer name, so that processability in real time is improved.

3 Claims, 5 Drawing Sheets

PRINTING CONTROL APPARATUS

BACKGROUND OF THE INVENTION

The present invention relates to a printing control apparatus and more particularly to a printing control apparatus for causing information to be output through one printer out of a plurality of printers on receiving printing demands from a plurality of terminal units.

In a conventional printing system comprising a plurality of terminal units, a plurality of printers and a printing control unit (print server), print output is obtainable from one of the printers under the control of such a print server when a user designates and transmits a printer name and printing data via a terminal unit. The print server has a print spooling function so that it can simultaneously accept printing commands from the plurality of terminal units. The print spooling function serves to temporarily store output data from the plurality of terminal units and to feed the stored output data to the printers in sequence.

Since the print spooling function is performed so as to output the output data in sequence, inconvenience is caused when real time output is required. In the case of a system described in Japanese Patent Unexamined Publication No. Sho 62-226220, for example, sheets of paper set on a paper tray are not used when printing is performed on a cut form but a separately set cut form is used. In this case, there arises inconvenience in that the timing of setting the cut form in a printer is not found out because data is not fed into the printer in real time after printing commands are given. For this reason, this system is arranged so that the function of giving priority to outputting designated data is provided, whereby the timing of setting the cut form in the front inserter of the printer is determined.

In a print server for controlling a plurality of printers, a virtual printer having standardized capabilities is assumed usable for absorbing different capabilities of printers by means of software on the sever, and terminal unit users are provided with the capabilities of the virtual printers instead of the capabilities of physical printers.

Nevertheless, there still exist processes to be performed directly for the physical printers even when the virtual printers are provided for the terminal unit users, the processes including font downloading, setting a user default environment, utilizing the manual feed function of the physical printer and so forth. Therefore, the problem is that even though the user who is provided with only the virtual printer as an object to which printing processes are performed, cannot perform the processes intended for any specific physical printer.

SUMMARY OF THE INVENTION

In view of the foregoing problems, an object of the present invention is to provide a printing control apparatus capable of offering users physical printer names through the same mechanism as what is intended for virtual printer names.

The printing control apparatus of the present invention causes information to be output through a printer out of a plurality of printers on receiving a printing demand from a plurality of terminal units, and comprises: job accepting means for accepting requests for printing from a user; printer information storage means for holding information concerning virtual printer names which are related to virtual printer setting information beforehand and information concerning physical printer names which are each related to printers; spool queue means having queues for use in holding jobs from the user so as to control the order in which the jobs are transmitted to the respective corresponding printers, the spool queue means being provided so as to correspond to individual virtual printers, and queue allocating means for identifying the printer name designated by the user so as to allocate the job to the corresponding queue of the spool queue means when the printer name is the virtual printer name, and to feed the job into the corresponding printer when the printer name is the physical printer name.

DETAILED DESCRIPTION OF THE INVENTION

First, the principle of a printing control apparatus according to the present invention will be described.

Figure 1:
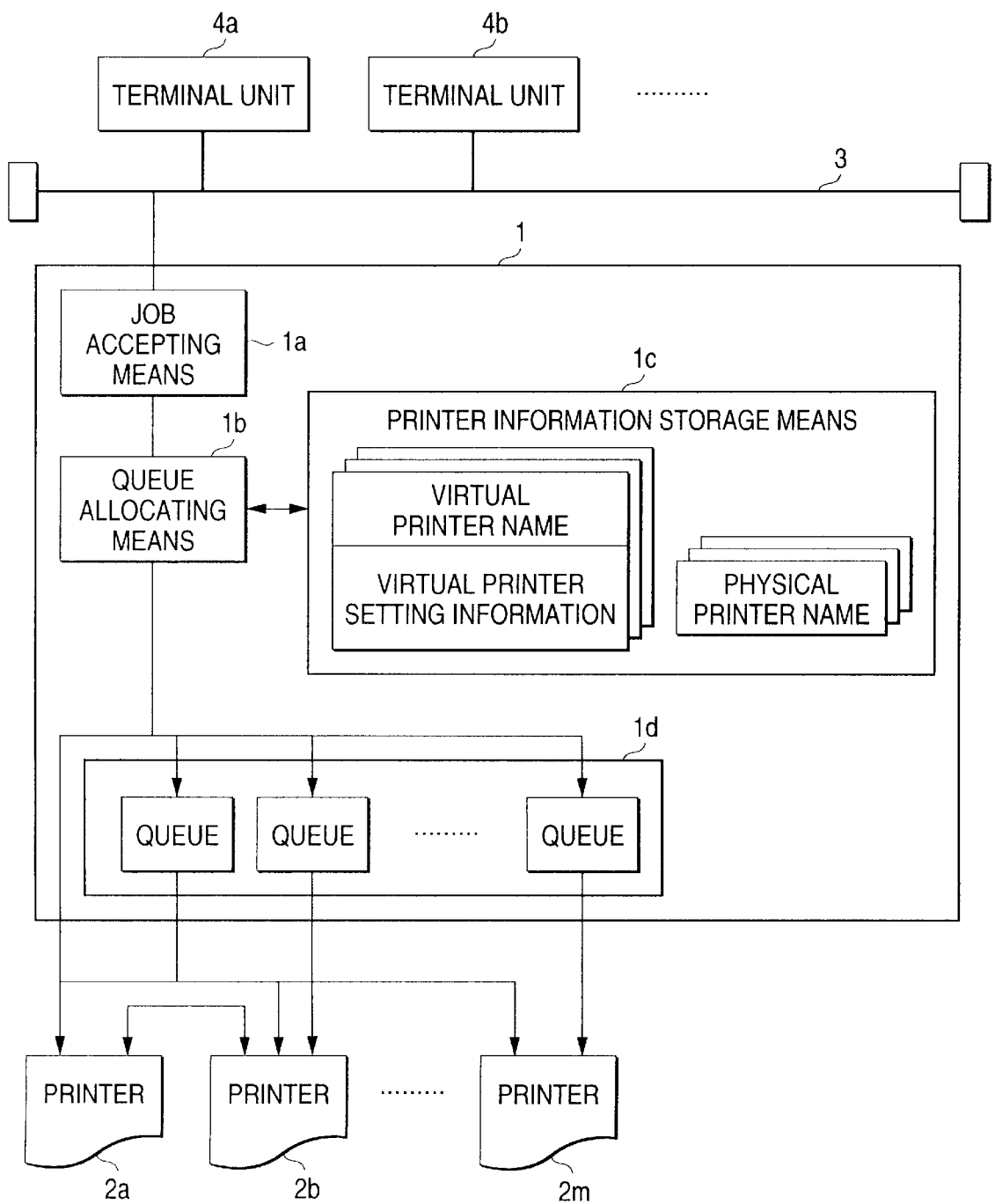
FIG. 1 is a block diagram illustrating the principle of a printing control apparatus embodying the present invention.

FIG. 1 is a block diagram illustrating the principle structure of a printing control apparatus embodying the present invention.

To a printing control apparatus 1 according to the present invention, for example, a plurality of printers 2a, 2b, . . . 2m and a plurality of terminal units 4a, 4b, . . . for issuing jobs via a network 3 are connected. The printing control apparatus 1 comprises job accepting means 1a for accepting the jobs issued by the terminal units 4a, 4b, . . . , queue allocating means 1b for allocating a queue according to a printer name designated by a user, printer information storage means 1c for holding information concerning physical printer names which are related to the respective printers and information concerning virtual printer names which are related to the plurality of printers, and spool queue means 1d having queues corresponding one-to-one to the respective virtual printers.

With the printing control apparatus 1 thus arranged, the job accepting means 1a accepts a print job including the printer name designated by and issued from any one of the users of the terminal units 4a, 4b, . . . to the printing control apparatus 1, and sends out the printer name designated by the user together with the print job data to the queue allocating means 1b. The queue allocating means 1bdecides whether the received printer name is the virtual printer name or the physical printer name by reference to the printer information stored in the printer information storage means 1c. If the printer name is the virtual printer name, the queue allocating means 1b adds to the job the virtual printer setting information related to the printer name beforehand and appends the job to the tail of the queue corresponding to the virtual printer in the spool queue means 1d. If the printer name is the physical printer name, on the other hand, the queue allocating means 1b transmits the print job data directly to the designated printer.

With the arrangement above, by issuing a job with a designated physical printer name, the user makes certain of having the job done by the specific physical printer without the aid of any queue. Processability in real time is thus improved and moreover the printing operation is simplified from the user's standpoint since it is only necessitated to designate the printer name for the purpose of outputting information therethrough.

An embodiment of the invention applied to a print server will next be described.

Figure 2:
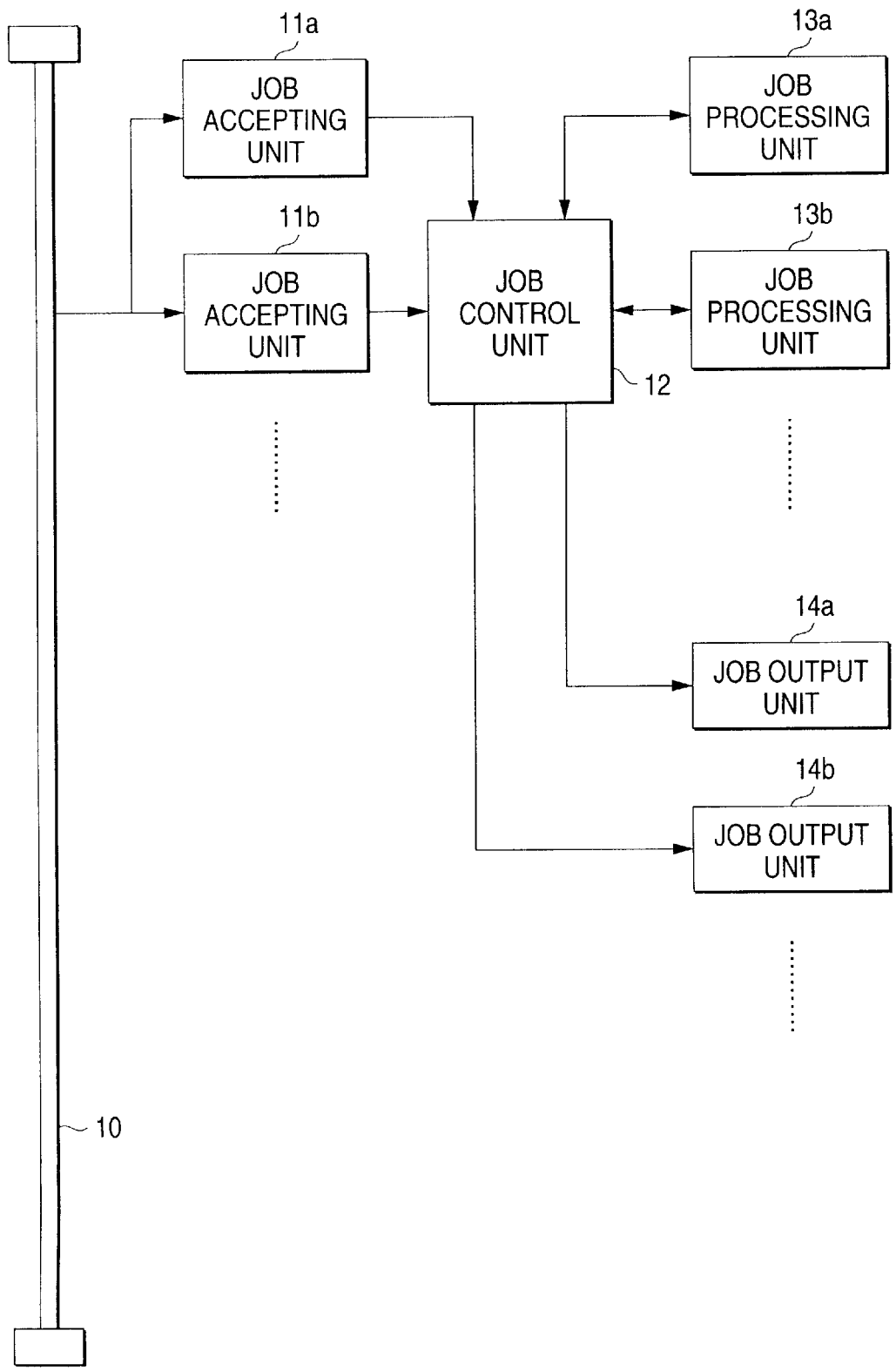
FIG. 2 is a block diagram illustrating an exemplary print server arrangement.

FIG. 2 is a block diagram illustrating an exemplary print server arrangement.

As shown in FIG. 2, the print server comprises a plurality of job accepting units 11a, 11b, . . . which are connected to a network 10, a job control unit 12, and a plurality of job processing units 13a, 13b, . . . Further, a plurality of job output units 14a, 14b, . . . for actually performing printing processes are connected to the job control unit 12. Printers and copying machines having printing functions are used as these job output units 14a, 14b, . . .

The job accepting units 11a, 11b, . . . are arranged so that they correspond to different job formats, respectively. A job received via the network 10 is accepted by the job accepting unit having a job format corresponding to the job, and the job accepting unit serves to convert the job format to a standardized format determined by the print server and deliver the standardized one to the job control unit 12. The job control unit 12 schedules the accepted job, controls queues and requests one of the job processing units 13a, 13b, . . . to perform processes necessary for doing the job. The processes includes document format conversion, page description language rasterization, notification and the like. Then the job control unit 12 sends out the job prepared for printing to one of the job processing units related to a designated logical printer or any other job processing unit corresponding to a designated physical printer.

Figure 3:
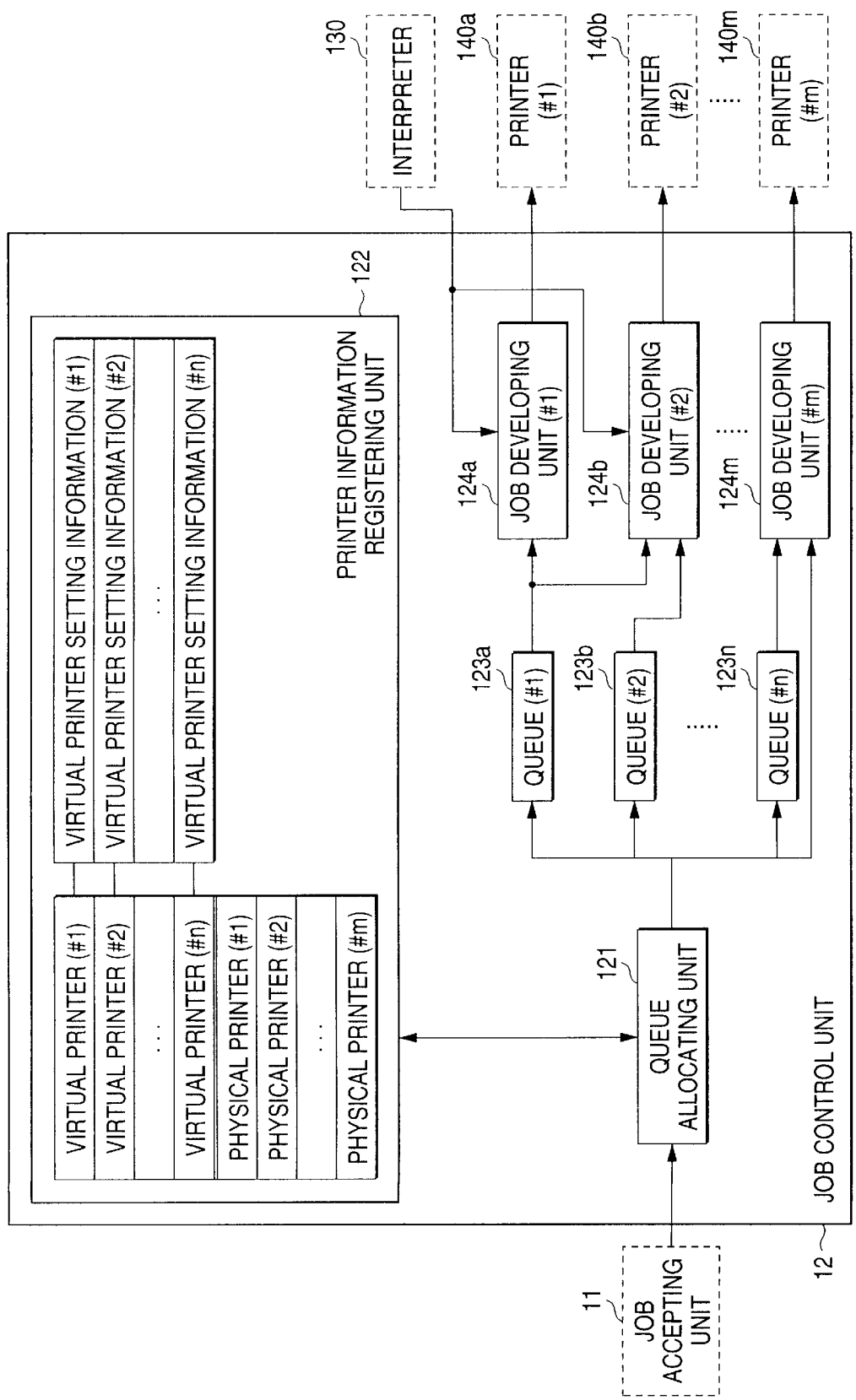
FIG. 3 is a block diagram illustrating an exemplary job control unit arrangement.

FIG. 3 is a block diagram illustrating an exemplary arrangement of the job control unit.

The job control unit 12 comprises a queue allocating unit 121 which is connected to a job accepting unit 11 in such a way as to receive the output of the job accepting unit 11, a printer information registering unit 122, queues 123a, 123b, . . . , 123n for controlling the order in which jobs are processed, the queues each corresponding to "n" pieces of virtual printers, and job developing units 124a, 124b, . . . , 124m each corresponding to "m" pieces of printers 140a, 140b, . . . , 140m. In the printer information registering unit 122, names of "n" pieces of virtual printers and "m" pieces of physical printer names are registered, and further each virtual printer name is defined by relating the virtual printer name to virtual printer setting information. As shown in FIG. 3, moreover, an interpreter 130 for interpreting a PostScript (Trade Mark of Adobe Systems Corp. of U.S.; hereinafter this indication will be omitted) language, for example, to process jobs is connected to the job developing units 124a and 124b.

The queue allocating unit 121 receives a set of 'printer name' and 'print job data' from the job accepting unit 11. Further, the queue allocating unit 121 checks the received printer name by reference to the printer information registering unit 122 and performs the process of sending out the job to the queue corresponding to the designated virtual printer or the job developing unit corresponding to the designated printer. A detailed description will subsequently be given of a process flow in the queue allocating unit 121.

Figure 4:
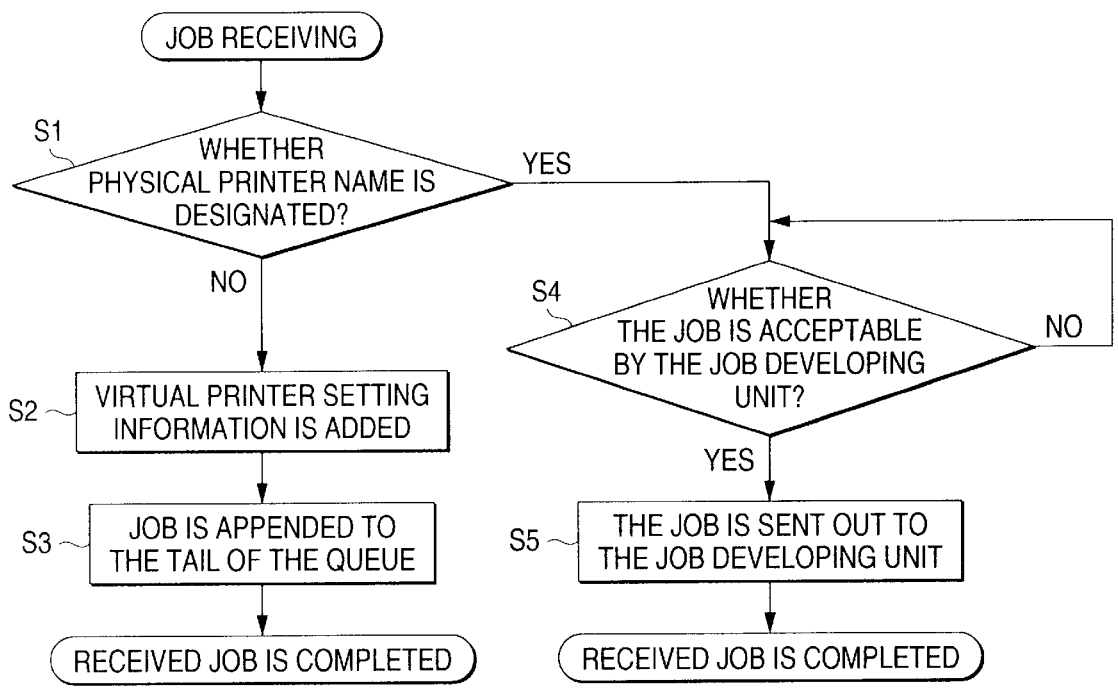
FIG. 4 is a flowchart showing the procedure for processing a job in a queue allocating unit.

FIG. 4 is a flowchart showing the procedure for processing a job in the queue allocating unit.

The queue allocating unit 121 decides whether or not a physical printer name has been designated in the printer name received from the job accepting unit 11 (Step S1). When the printer name thus designated is a virtual printer name, the queue allocating unit 121 adds to the job the virtual printer setting information defined by relating the virtual printer name thereto in the printer information registering unit 122 (Step S2), and further appends the job with the added virtual printer setting information to the tail of the queue corresponding to the virtual printer (Step S3). When the physical printer name has been designated in the designated printer name, the queue allocating unit 121 decides whether or not the job is acceptable by the job developing unit corresponding to the designated printer (Step S4). If the job is not acceptable because the preceding job is being done, the queue allocating unit 121 waits until the job becomes acceptable and then sends out the job directly to the job developing unit without the aid of any queue (step S5).

Referring to FIG. 3 again, the queue allocating unit 121 subsequently sends out job data with the added virtual printer setting information to the queue corresponding to the designated virtual printer out of the queues 123a, 123b, . . . , 123n when it is decided that the designated printer name is the virtual printer name. On receiving the job data, the queue appends the job to its tail and hold it. In the virtual printer setting information added to each job, not less than one identifier for the job developing unit to which the job should be sent out is set, and the queue reads information on the identifier from the leading job setting information and waits for an event indicative of the acceptability of the job from the corresponding job developing unit. In a case where the plurality of corresponding job developing units exist, the queue sends out the job to the job developing unit which is able to accept the job first. The next job is subjected to the same process after the sending of one job is completed. Here, the procedure for processing the leading job in the queue will be described.

Figure 5:
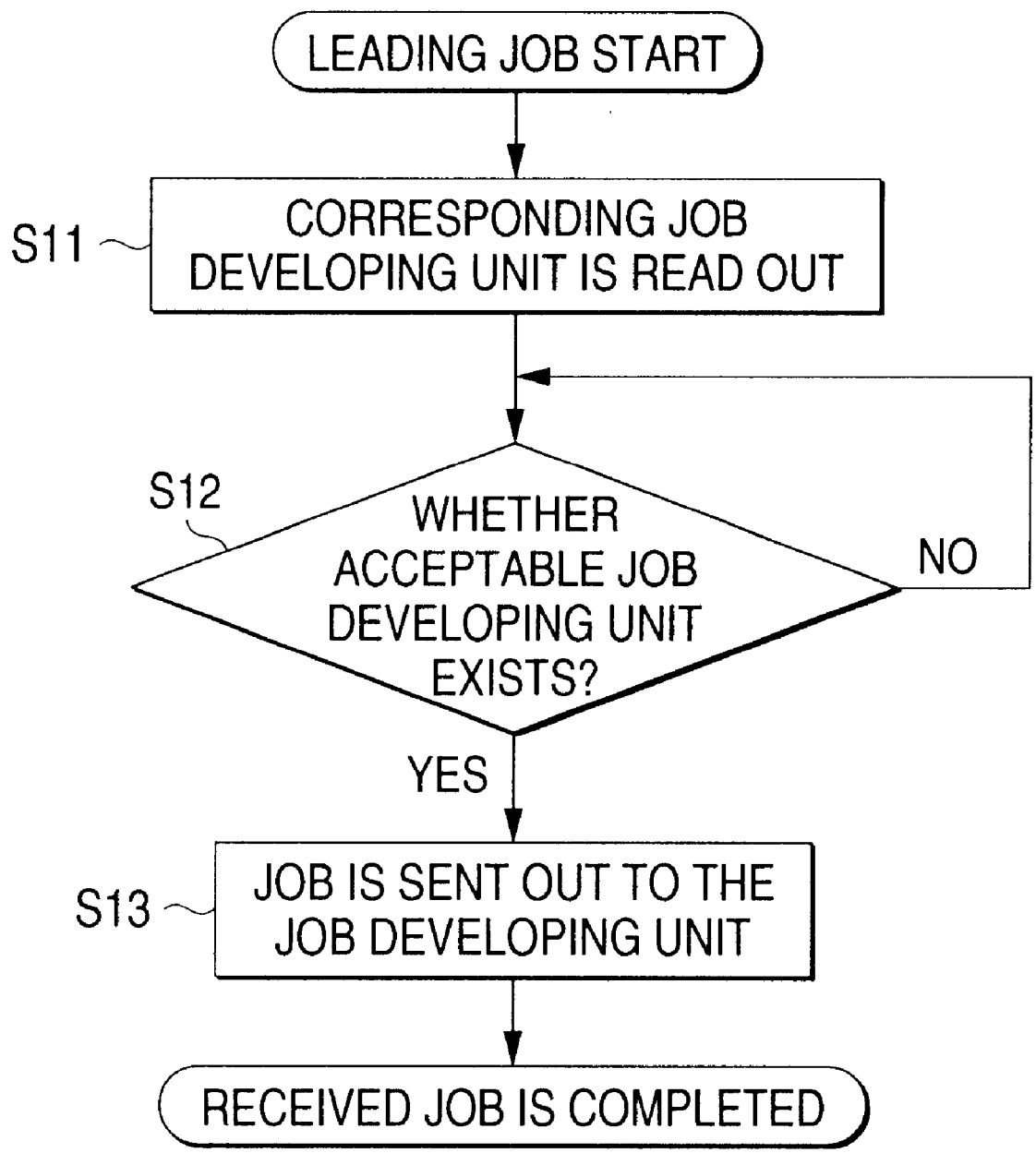
FIG. 5 is a flowchart showing the procedure for processing a leading job in a printer.

FIG. 5 is a flowchart showing the procedure for processing the leading job in the queue.

In the queue 123a, 123b, . . . , 123n where at least one job is stored, information on the identifier of the job developing unit to which a job should be sent out, is first read from the virtual printer setting information on the leading job stored (Step S11). Subsequently, a decision is made on whether or not the job developing unit capable of accepting the job exists out of the job developing units registered in the virtual printer setting information (Step S12). If no job developing unit capable of accepting the job exists, the queue waits until any one of the job developing units becomes able to accept the job. The queue sends out the job to the job developing unit capable of accepting the job, if any (Step S13), whereby the processing of the leading job is completed.

Referring to FIG. 3 again, since the job developing unit 124a, 124b, . . . , 124m one-to-one corresponds to the printer 140a, 140b, . . . , 140m, the job developing unit subjects the job sent from the queue to the necessary processing before transmitting the job to the corresponding printer 140a, 140b, . . . , 140m. The number of jobs that the job developing unit 124a, 124b, . . . , 124m can deal with at one time is one and consequently the job developing unit is unable to accept a new job during the time it is processing the existing job. Moreover, the job developing unit 140a, 140b, . . . , 140m causes an event indicative of the acceptability of a job to be produced when no job in process exists after sending out the job held to the printer 140a, 140b, . . . , 240m. Some job developing unit may request an outside device to process a job which requires format conversion, page description language rasterizing and the like. In the example shown in FIG. 3, the first and second job developing units 124a and 124*b* rely on the interpreter 130 used to interpret the PostScript language for performing the rasterizing process.

The operation of the job control unit 12 in the print server will next be described by using specific data.

To start with, it is assumed that the first and second printers 140*a* and 140*b* perform a printing function on receiving rasterized bit map data and that the m-th printer 140*m* has a single-/two-sided printing function by interpreting PCL (page describing language of Hewlett-Packard Co. of U.S.) data. The virtual printer names registered in the printer information registering unit 122 and the corresponding virtual printer setting information in conformity with the aforementioned functions are as follows:

(1) Virtual printer name #1:=PS-2 UP

Job developing unit:=(job developing unit #1, job developing unit #2)

Printer language:=PostScript

2–UP printing:=TRUE

Two-sided printing:=FALSE (2) Virtual printer name #n:=PCL-DUPLEX

Job developing unit:=(job developing unit #m)

Printer language:=PCL

2–UP printing:=FALSE

Two-sided printing:=TRUE

Further, the following physical printer name is also registered:

(3) Physical printer name #1:=PCL-PHYSICAL

Job developing unit:=job developing unit #m

The user selects one of the three printer names above and transmits a job. When the job is accepted by the job accepting unit 11 and fed by the queue allocating unit 121, the queue allocating unit 121 identifies the designated printer name first. In the case where the printer name is 'PS-2 UP', the job is appended to the corresponding queue (#1) 123*a* and where the printer name is 'PCL-DUPLEX', the job is appended to the corresponding queue (#n) 123*n*. In the case where the printer name is 'PCL-PHYSICAL', the job is transmitted directly to the job developing unit (#n) 124*m*. When the job developing unit (#m) 124*m* is unable to accept a job since, for example, it is processing the existing one, the queue stands ready to transmit the job.

The queue (#1) 123*a* checks whether or not a job is acceptable by the job developing units (#1) 124*a* and (#2) 124*b* related thereto and transmits the leading job stored therein to any one of them which can accept the job first.

The job developing unit (#1) 124*a* and the job developing unit (#2) 124*b* are connected to the interpreter 130 for interpreting the PostScript language and when they have received a job from the queue 123*a*, they request the interpreter 130 to convert the job into the bit map data developed by 2 up and then acquire the converted data so as to transmit it to the corresponding printer 140*a* or 140*b*.

On the other hand, the job developing unit (#m) 124*m* transmits header data indicative of two-sided printing to the printer 140*m* on receiving the job from the queue (#n) 123*n* and subsequently transmits print job data thereto.

When fonts, for example, are down-loaded into the printer 140*m*, the user designates the physical printer name 'PCL-PHYSICAL'. When, moreover, control data for resetting the user default environment such as switching default paper size in the printer 140*m* from 'LETTER' to 'A4', is transmitted, the user also designates the physical printer name 'PCL-PHYSICAL'.

As set forth above, the printing control apparatus according to the present invention is provided with the queue allocating means, which appends the jot to the tail of the corresponding spool queue when the user designates the virtual printer name, and transmits the job directly to the physical printer when the user designates the physical printer name. Therefore, the operation of such as font downloading, setting the user default environment with respect to the specific physical printer is performable for certain without the aid of the virtual queue and when the manual feed function of the physical printer is utilized, processability in real time is made improvable by designating the physical printer name.

Moreover, the printing operation is simplified from the user's standpoint since only the designation of the printer name is sufficient to differentiate the case where the printing output with the added printing control information is designated from the case where the printing output is designated for the specific physical printer.

Since one queue is related to the plurality of physical printers by providing the queues on the virtual printer side, further, the printed result is obtainable from another printer even though any one of the printers becomes unusable.

What is claimed is:

1. A printing control apparatus for causing information to be output through one of a plurality of printers on receiving a print job from one of a plurality of terminal units, the apparatus comprising:

job accepting means for accepting a print job from a user;

printer information storage means for holding information concerning a plurality of virtual printer names, each related to printing control information, and information concerning a plurality of physical printer names, each related to physical printers connected to a network;

spool queue means including a plurality of queues for holding jobs from the user so as to control the order in which the jobs are transmitted to a physical printer, each of the queues of the spool queue means corresponding to one of the plurality of virtual printer names, and each physical printer connected to a queue in the spool queue means; and queue allocating means for identifying a printer name designated by the user so as to allocate the job to the corresponding queue of the spool queue means when the printer name is the virtual printer name corresponding to the queue, and directly feed the job into the corresponding physical printer when the printer name is the physical printer name.

2. A printing control apparatus as claimed in claim 1, wherein the printer information storage means stores virtual printer setting information for each of the virtual printer names.

3. A printing control apparatus as claimed in claim 2, wherein the queue allocating means is arranged so that when the printer name designated by the user is a virtual printer name, the queue allocating means adds to the job the virtual printer setting information for the virtual printer name and appends that job to a tail of the corresponding queue of the spool queue means.

\* \* \* \* \*